HILT & RAUSCH.
Dummy Engine.
No. 43,208.
2 Sheets—Sheet 1.
Patented June 21, 1864.
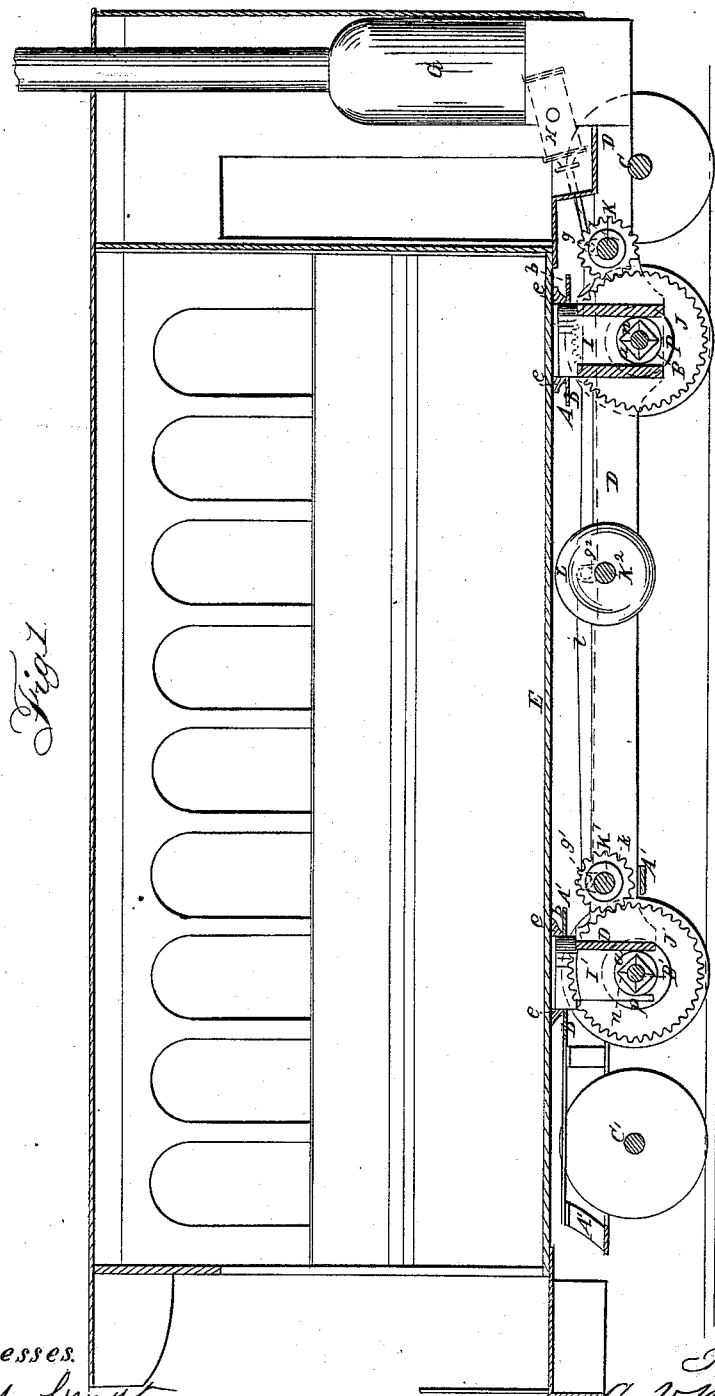
Witnesses.
Inventor.

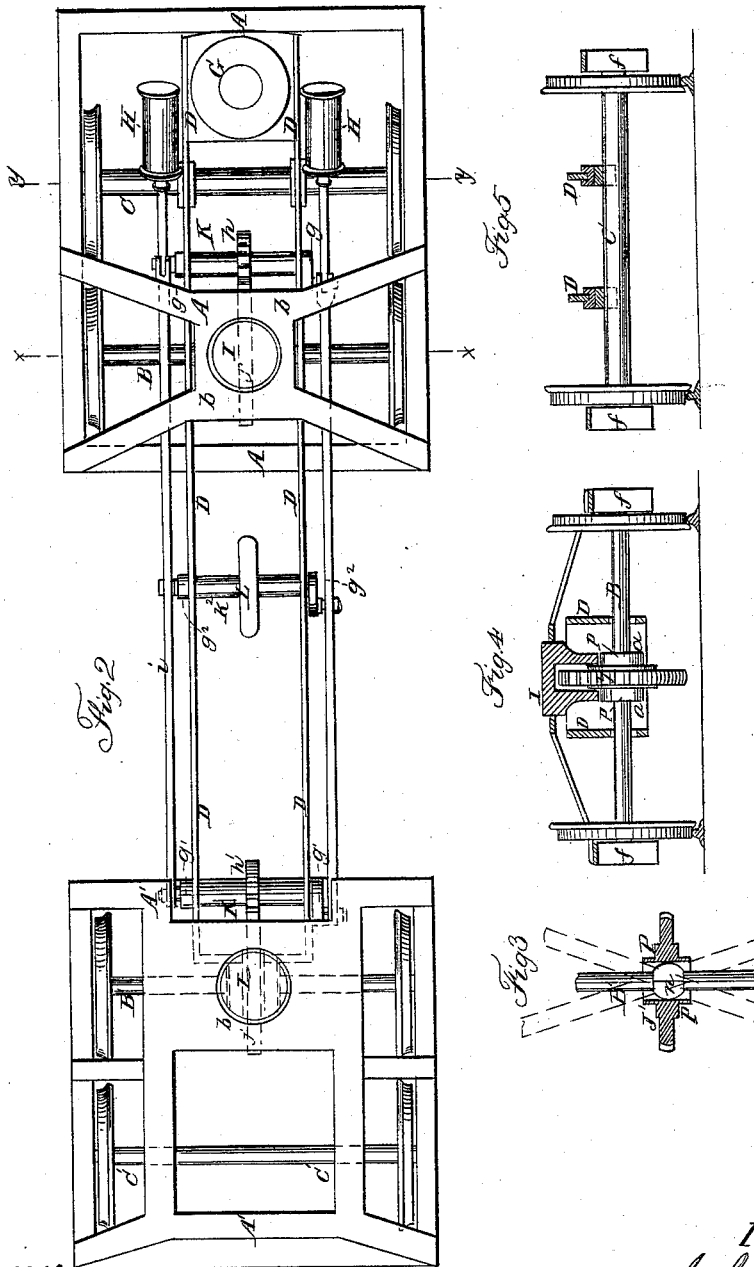

UNITED STATES PATENT OFFICE.

ISAAC L. HILT AND A. V. W. RAUSCH, OF FRANKFORD, PENNSYLVANIA.

IMPROVEMENT IN DUMMY-LOCOMOTIVE TRUCKS.

Specification forming part of Letters Patent No. 43,208, dated June 21, 1864.

*To all whom it may concern:*

Be it known that we, ISAAC L. HILT and A. V. W. RAUSCH, both of Frankford, in the county of Philadelphia and State of Pennsylvania, have invented certain new and useful Improvements in Dummy-Locomotives and Steam-Railway Cars; and we do hereby declare that the following is a full, clear, and exact description thereof, which will enable persons skilled in the art to make and use the same, reference being had to the accompanying drawings, forming part of this specification, in which—

Figure 1 is a longitudinal vertical section of a steam-railway car. Fig. 2 is a plan of the engine and running-gear. Fig. 3 is a plan of a portion of one of the driving-axles and section of the cog wheel which is fitted thereon.

Similar letters of reference indicate corresponding parts.

This invention consists in certain improvements in the running-gear of dummy-locomotives and steam-railway cars, whereby greater facility is afforded for turning curves, and the driving-power is applied to trucks at both ends of the locomotive or car, and the body of the car is relieved from all jarring otherwise caused by the engines and their attachments.

A A′ are two independent four-wheel trucks, arranged one at each end of the locomotive or car, and supported on their axles B C and B′ C′, in the usual manner. D is a long supporting-frame, of iron or wood, connecting the two trucks A and A′, and supporting the car-body E, the boiler G, and the engines H H. This frame has rigidly connected with it, in positions over the two axles B B′, which are both driving-axles, two pedestals, I I′, which are supported upon and fitted to journals $a\,a$, provided on the hubs of two driving cog-wheels, J J′, which are arranged one upon each of the two driving-axles B B′. The upper parts of these pedestals are made in the form of upright pivots, which are fitted to bearings provided for them in the transoms $b\,b$ of the trucks, and so serve to connect the two trucks with the frame D, and which are also received in sockets $e\,e$, secured firmly to the bottom of the car-body E, for the purpose of retaining the body of the car in its proper position relatively to the frame D and the trucks. The body E, may also be supported upon the trucks by friction-rollers or other means which will prevent it from interfering with the free swinging or turning movements of the trucks. The frame D does not extend rearward beyond the front or driving axle B′ of the rear truck A, but extends forward beyond the rear or driving axle B of the forward truck and over the front axle C of the latter, and in order to support the boiler and cylinders of the engine, which are at the front end of the said frame, which overhangs the axle C, the said frame is also supported upon the latter axle by means of boxes $f\,f$, which rest upon the said axle, and the backs of which are grooved, as shown in Fig. 5, to fit the lower edges of the frame in such manner that they may be prevented from moving laterally in the said frame, but permitted to move longitudinally thereto as the trucks turn in running over curves, in which operation the axle C moves lengthwise within the said boxes.

The engine-pistons are connected with cranks $g\,g$ upon a counter-shaft, K, arranged in fixed bearings upon the frame D, and geared by a pinion, $h$, with the cog-wheel J upon the forward driving-axle B. The cranks $g\,g$ are also connected by long coupling-rods $i\,i$ with two cranks, $g'\,g'$, on a counter-shaft, K, which is arranged on bearings in the rear portion of the frame D, and which is geared by a pinion, $h'$, similar to $h$, with the cog-wheel J′ of the rear driving-shaft B′. The rods $i\,i$ are also connected at the middle of their length with cranks $g^2\,g^2$ on a third counter-shaft arranged in suitable bearings on the frame D at the middle of its length. The object of this third counter-shaft and cranks is to stiffen and strengthen the rods $i\,i$. The said shaft is furnished with a fly-wheel, L, which helps the cranks over their centers and equalizes their motion. The pinions $h$ and $h'$ are rigidly secured upon their respective counter-shafts; but in order to provide for their respective cog-wheels J and J′ remaining in gear with them as the trucks swing or vibrate about the pivots of the pedestals I I′ in turning curves, the said cog-wheels must be free to oscillate upon their respective axles, as shown in red and blue outlines in Fig. 3. This oscillation is provided for by enlarging the portion of each axle which is received within the hub of the wheel, as shown at $n$ in Figs. 1 and 3, so that the form of its longitudinal section is that of a circle described from the center of the axle and its transverse section is square. The opening provided in the center of the wheel for the reception of the axle is square, and of the same size all the way through, as the largest part of the swell $n$ of the axle. The cog-wheels are held in their places on the swells of the axles by their broad hubs $p$ $p$, fitting into openings in the pedestals I I', as shown in Fig. 4, and while so held in place are kept parallel with the frame D, and in line with their respective pinions whatever position the trucks and axles may assume with reference to the frame D in turning curves. The cogs of the wheels J J' should be slightly rounded on their faces.

What we claim as our invention, and desire to secure by Letters Patent, is—

1. The two independent trucks A A', pivoted to and combined with the supporting-frame D by means of pedestals I I', which are arranged directly over one of the axles of each truck, and which serve at the same time as a means of transferring the weight of the said frame to the axles, substantially as herein specified.

2. The two pedestals I I', constructed with pivot-like heads to enter sockets $e$ $e$, attached to the bottom of the car-body, and thereby keep the body in place upon the supporting-frame D of the engine and driving mechanism, substantially as herein described, as well as pivot the said frame to the trucks.

3. The combination of the two counter-shafts K K', one constituting the crank-shaft of the engine and the other coupled with it by cranks and connecting-rods, and one geared with one of the axles of one of the independent trucks and the other gearing with one of the axles of the other of said trucks, for the purpose of applying power to axles of both trucks, substantially as herein specified.

4. The intermediate counter-shaft, $K^2$, and its cranks $g^2$ $g^2$, applied in combination with the counter-shaft K K' and connecting-rods $i$ $i$, substantially and for the purpose herein specified.

5. The sliding boxes $f f$, applied in combination with the frame D and forward axle of the forward truck to slide longitudinally upon the said frame and allow the axle to slide within them, thereby providing for the support of a portion of the weight of the boiler and heavy parts of the engine upon the said axle while providing for the vibration of the truck, substantially as herein described.

6. Keeping the cog-wheels of the driving-axles in line with the frame D, and the pinions of the counter-shafts by so fitting them to their respective axles that they are free to oscillate laterally thereon, and fitting their hubs to openings in the pedestals I I', or their equivalents, substantially as herein specified.

ISAAC L. HILT.
AUGUST V. W. RAUSCH.

Witnesses:
CHAS. H. BAKER,
LEWIS H. GRANT.